US011772368B2

(12) United States Patent
Gkinosatis

(10) Patent No.: US 11,772,368 B2
(45) Date of Patent: Oct. 3, 2023

(54) FIBC LINER FILM

(71) Applicant: FLEXOPACK S.A., Koropi (GR)

(72) Inventor: Dimitris Gkinosatis, Koropi Attica (GR)

(73) Assignee: FLEXOPACK S.A., Koropi (GR)

( * ) Notice: Subject to any disclaimer, the term of this patent is extended or adjusted under 35 U.S.C. 154(b) by 0 days.

(21) Appl. No.: 16/227,178

(22) Filed: Dec. 20, 2018

(65) Prior Publication Data

US 2019/0193378 A1 Jun. 27, 2019

(30) Foreign Application Priority Data

Dec. 22, 2017 (EP) .................................. 17210227

(51) Int. Cl.
| | | |
|---|---|---|
| *B32B 27/08* | (2006.01) | |
| *B32B 1/08* | (2006.01) | |
| *B32B 27/30* | (2006.01) | |
| *B32B 27/34* | (2006.01) | |
| *B32B 27/32* | (2006.01) | |
| *B65D 88/16* | (2006.01) | |
| *B32B 1/00* | (2006.01) | |
| *B32B 27/28* | (2006.01) | |

(52) U.S. Cl.
CPC ............... *B32B 27/08* (2013.01); *B32B 1/00* (2013.01); *B32B 1/08* (2013.01); *B32B 27/285* (2013.01); *B32B 27/306* (2013.01); *B32B 27/32* (2013.01); *B32B 27/34* (2013.01); *B65D 88/1612* (2013.01); *B32B 2250/02* (2013.01); *B32B 2250/05* (2013.01); *B32B 2250/24* (2013.01); *B32B 2270/00* (2013.01); *B32B 2307/31* (2013.01); *B32B 2307/7244* (2013.01); *B32B 2307/738* (2013.01); *B32B 2439/46* (2013.01); *B32B 2439/70* (2013.01); *Y10T 428/1334* (2015.01); *Y10T 428/1341* (2015.01)

(58) Field of Classification Search
CPC ............ B32B 2250/05; B32B 2250/24; B32B 2270/00; B32B 2307/31; B32B 2307/7244; B32B 2439/46; B32B 2439/70; B32B 27/08; B32B 27/285; B32B 27/306; B32B 27/32; B32B 1/00; B32B 1/08; B32B 2250/02; B32B 2307/738; B32B 27/34; B32B 2329/04; B65D 88/1612; Y10T 428/1334; Y10T 428/1341

See application file for complete search history.

(56) References Cited

U.S. PATENT DOCUMENTS

| | | |
|---|---|---|
| 2,380,054 A | 8/1943 | Lautmann |
| 2,376,185 A | 5/1945 | Randall |
| 3,214,884 A | 11/1965 | Langdon |
| 3,299,194 A | 1/1967 | Golike |
| 3,456,044 A | 7/1969 | Pahlke |
| 3,536,192 A | 10/1970 | Couper |
| 3,846,569 A | 11/1974 | Kaplan |
| 3,908,336 A | 9/1975 | Forslund |
| 3,956,229 A | 5/1976 | Bollen et al. |
| 4,064,296 A | 12/1977 | Bornstein et al. |
| 4,207,363 A | 6/1980 | Lustig |
| 4,207,364 A | 6/1980 | Nyberg |
| 4,220,684 A | 9/1980 | Olson |
| 4,254,869 A | 3/1981 | Heier |
| 4,362,834 A | 12/1982 | Lefevre et al. |
| 4,399,181 A | 8/1983 | Yoshimura et al. |
| 4,595,433 A | 6/1986 | Ford et al. |
| 4,612,221 A | 9/1986 | Biel et al. |
| 4,619,849 A | 10/1986 | Anzawa et al. |
| 4,650,721 A | 3/1987 | Ashcraft et al. |
| 4,701,360 A | 10/1987 | Gibbons et al. |
| 4,705,707 A | 11/1987 | Winter |
| 4,716,061 A | 12/1987 | Winter |
| 4,724,185 A | 2/1988 | Shah |
| 4,786,561 A | 11/1988 | Fong |
| 4,801,486 A | 1/1989 | Quacquarella et al. |
| 4,828,915 A | 5/1989 | Schroeder et al. |
| 4,857,399 A | 8/1989 | Vicik |
| 4,863,769 A | 9/1989 | Lustig et al. |
| 4,869,049 A | 9/1989 | Richards et al. |
| 4,879,430 A | 11/1989 | Hoffman |
| 4,911,979 A | 3/1990 | Nishimoto et al. |
| 4,912,149 A | 3/1990 | Robeson et al. |
| 4,934,529 A | 6/1990 | Richards et al. |
| 4,941,310 A | 7/1990 | Kristen |
| 4,948,657 A | 8/1990 | Ogawa et al. |
| 4,976,898 A | 12/1990 | Lustig et al. |

(Continued)

FOREIGN PATENT DOCUMENTS

| | | |
|---|---|---|
| AU | 511 195 B2 | 7/1980 |
| CN | 104695251 A | 6/2015 |

(Continued)

OTHER PUBLICATIONS

Decision on Appeal corresponding to U.S. Appl. No. 12/957,947 dated Sep. 18, 2020.
Office Action corresponding to European Patent Application No. 10193414.9 dated Apr. 7, 2020.
Office Action corresponding to U.S. Appl. No. 14/946,169 dated Aug. 21, 2020.
Office Action corresponding to U.S. Appl. No. 16/227,191 dated Aug. 31, 2020.
Advisory Action and AFCP 2.0 Decision corresponding to U.S. Appl. No. 14/612,175 dated Jun. 1, 2020.
Office Action corresponding to U.S. Appl. No. 12/322,347 dated Aug. 19, 2019.

(Continued)

*Primary Examiner* — Yan Lan
(74) *Attorney, Agent, or Firm* — Jenkins, Taylor & Hunt, P.A.

(57) ABSTRACT

The invention relates to plastic film preferably with a thickness of 50 to 300 microns, comprising a polyolefin homopolymer or copolymer, a polyether copolymer having a melting point between 100° C. and 120° C. and a layer comprising oxygen barrier polymer.

18 Claims, No Drawings

(56) References Cited

U.S. PATENT DOCUMENTS

| | | |
|---|---|---|
| 4,977,022 A | 12/1990 | Mueller |
| 4,990,562 A | 2/1991 | Chou et al. |
| 5,001,192 A | 3/1991 | Sun |
| 5,002,996 A | 3/1991 | Okuda et al. |
| 5,034,281 A | 7/1991 | Kawasaki et al. |
| 5,079,051 A | 1/1992 | Garland et al. |
| 5,092,105 A | 3/1992 | Bish |
| 5,142,123 A | 8/1992 | Chou |
| 5,145,728 A | 9/1992 | Itaba et al. |
| 5,169,708 A | 12/1992 | Amaral et al. |
| 5,179,168 A | 1/1993 | Hirasawa |
| 5,256,351 A | 10/1993 | Lustig et al. |
| 5,256,428 A | 10/1993 | Lustig et al. |
| 5,296,580 A | 3/1994 | Matsunaga et al. |
| 5,298,202 A | 3/1994 | Schirmer |
| 5,302,402 A | 4/1994 | Dudenhoeffer et al. |
| 5,350,788 A | 9/1994 | Visioli et al. |
| 5,358,792 A | 10/1994 | Mehta et al. |
| 5,382,470 A | 1/1995 | Vicik |
| 5,397,613 A | 3/1995 | Georgelos |
| 5,562,958 A | 10/1996 | Walton et al. |
| 5,593,747 A | 1/1997 | Georgelos |
| 5,645,788 A | 7/1997 | Bekele |
| 5,698,279 A | 12/1997 | Vicik |
| 5,759,648 A | 6/1998 | Idlas |
| 5,834,077 A | 11/1998 | Babrowicz |
| 5,837,335 A | 11/1998 | Babrowicz |
| 5,851,610 A | 12/1998 | Ristey et al. |
| 5,888,615 A | 3/1999 | Mascarenhas et al. |
| 5,983,607 A | 11/1999 | Mihalov et al. |
| 6,013,378 A | 1/2000 | White et al. |
| 6,058,998 A | 5/2000 | Kristen |
| 6,065,272 A | 5/2000 | Lecomte |
| 6,074,715 A | 6/2000 | Lind et al. |
| 6,088,996 A | 7/2000 | Maruyama |
| 6,120,860 A | 9/2000 | Bowen |
| 6,146,726 A | 11/2000 | Yoshii et al. |
| 6,220,753 B1 | 4/2001 | Metzger |
| 6,221,410 B1 | 4/2001 | Ramesh et al. |
| 6,258,423 B1 | 7/2001 | Giori |
| 6,274,246 B1 | 8/2001 | Eggers et al. |
| 6,299,984 B1 | 10/2001 | Forloni |
| 6,346,285 B1 | 2/2002 | Ramesh |
| 6,346,576 B1 | 2/2002 | Takahashi |
| 6,374,579 B1 | 4/2002 | Muller |
| 6,383,589 B1 | 5/2002 | Horan et al. |
| 6,406,763 B1 | 6/2002 | Wolf et al. |
| 6,458,437 B1 | 10/2002 | Ito et al. |
| 6,506,463 B1 | 1/2003 | Cahill et al. |
| 6,514,583 B1 | 2/2003 | Ahlgren et al. |
| 6,516,588 B2 | 2/2003 | Jensen et al. |
| 6,531,198 B2 | 3/2003 | Lind et al. |
| 6,534,137 B1 | 3/2003 | Vadhar |
| 6,558,760 B1 | 5/2003 | Paleari et al. |
| 6,572,959 B1 | 6/2003 | Buongiorno et al. |
| 6,592,975 B1 | 7/2003 | Ueyama et al. |
| 6,610,046 B1 | 8/2003 | Usami et al. |
| 6,663,905 B1 | 12/2003 | Ennis et al. |
| 6,682,792 B2 | 1/2004 | Schmal et al. |
| 6,682,825 B1 | 1/2004 | Kennedy et al. |
| 6,777,046 B1 | 8/2004 | Tatarka et al. |
| 6,869,686 B1 | 3/2005 | Idlas |
| 6,960,635 B2 | 11/2005 | Stevens et al. |
| 6,984,695 B2 | 1/2006 | Brown et al. |
| 7,473,473 B2 | 1/2009 | Verrocchi |
| 7,504,158 B2 | 3/2009 | Berrier et al. |
| 7,611,770 B2 | 11/2009 | Kennedy et al. |
| 7,736,726 B2 | 6/2010 | McAllister et al. |
| 8,129,006 B2 | 3/2012 | Ginossatis |
| 8,697,211 B2 | 4/2014 | Gkinosatis |
| 9,290,320 B2 | 3/2016 | Gkinosatis |
| 9,365,687 B2 | 6/2016 | Gkinosatis |
| 9,440,778 B2 | 9/2016 | Gkinosatis |
| 9,440,788 B2 | 9/2016 | Gkinosatis |
| 9,604,430 B2 | 3/2017 | Gkinosatis |
| 9,789,669 B2 | 10/2017 | Gkinosatis |
| 10,287,094 B2 | 5/2019 | Gkinosatis |
| 2002/0038535 A1 | 4/2002 | Jensen et al. |
| 2002/0066261 A1 | 6/2002 | Richards |
| 2002/0119334 A1 | 8/2002 | Shepard et al. |
| 2002/0151653 A1 | 10/2002 | Jeong et al. |
| 2002/0172834 A1 | 11/2002 | Rivett et al. |
| 2003/0008084 A1 | 1/2003 | Vicik et al. |
| 2003/0012900 A1 | 1/2003 | Wolf et al. |
| 2003/0073785 A1 | 4/2003 | Okada et al. |
| 2003/0124452 A1 | 7/2003 | Nair et al. |
| 2003/0131569 A1 | 7/2003 | Chomik et al. |
| 2003/0153688 A1 | 8/2003 | Lindahl et al. |
| 2003/0213804 A1 | 11/2003 | Chomik et al. |
| 2003/0218022 A1 | 11/2003 | Chomik et al. |
| 2003/0220453 A1 | 11/2003 | Ebara et al. |
| 2004/0020175 A1 | 2/2004 | Stravitz |
| 2004/0020913 A1 | 2/2004 | Hovorka |
| 2004/0043238 A1 | 3/2004 | Wuest et al. |
| 2004/0048086 A1 | 3/2004 | Kennedy et al. |
| 2004/0065052 A1 | 4/2004 | Ramesh et al. |
| 2004/0074904 A1 | 4/2004 | Share et al. |
| 2004/0115453 A1 | 6/2004 | McAllister, Jr. et al. |
| 2004/0157077 A1 | 8/2004 | Roussos |
| 2004/0158016 A1 | 8/2004 | Lee et al. |
| 2004/0159972 A1 | 8/2004 | Koschmieder et al. |
| 2004/0194433 A1 | 10/2004 | Chomik et al. |
| 2005/0044819 A1 | 3/2005 | Chomik et al. |
| 2005/0064123 A1 | 3/2005 | Chomik et al. |
| 2005/0079372 A1 | 4/2005 | Schmal et al. |
| 2005/0098927 A1 | 5/2005 | Iseki et al. |
| 2005/0129811 A1 | 6/2005 | Kraimer et al. |
| 2005/0147778 A1 | 7/2005 | Tai et al. |
| 2005/0148268 A1 | 7/2005 | Tai |
| 2005/0191439 A1 | 9/2005 | Hirose et al. |
| 2005/0235611 A1 | 10/2005 | Roussos |
| 2005/0239961 A1 | 10/2005 | Saraf et al. |
| 2005/0271877 A1 | 12/2005 | Ginossatis |
| 2006/0010837 A1 | 1/2006 | Jurus |
| 2006/0172143 A1 | 8/2006 | Breese et al. |
| 2006/0177616 A1 | 8/2006 | Barber et al. |
| 2006/0177641 A1 | 8/2006 | Breese et al. |
| 2006/0188676 A1 | 8/2006 | Dambricourt |
| 2006/0199030 A1 | 9/2006 | Liang et al. |
| 2006/0199911 A1 | 9/2006 | Markovich et al. |
| 2006/0199912 A1 | 9/2006 | Fuchs et al. |
| 2006/0254219 A1 | 11/2006 | Alipour et al. |
| 2006/0272767 A1 | 12/2006 | Kreitman et al. |
| 2006/0283153 A1 | 12/2006 | Nakano |
| 2006/0286323 A1 | 12/2006 | Siegel et al. |
| 2007/0031546 A1 | 2/2007 | Nelson et al. |
| 2007/0042089 A1 | 2/2007 | Grah |
| 2007/0082150 A1 | 4/2007 | Ginossatis |
| 2007/0089688 A1 | 4/2007 | Nitzsche et al. |
| 2007/0092748 A1 | 4/2007 | Suzuki et al. |
| 2007/0098933 A1 | 5/2007 | Opuszko et al. |
| 2007/0178285 A1 | 8/2007 | Rasanen et al. |
| 2007/0237916 A1 | 10/2007 | Rasmussen et al. |
| 2007/0276110 A1 | 11/2007 | Michie et al. |
| 2008/0003332 A1 | 1/2008 | Ginossatis |
| 2008/0070047 A1 | 3/2008 | Rehkugler et al. |
| 2008/0095960 A1 | 4/2008 | Schell et al. |
| 2008/0115463 A1 | 5/2008 | Wilson |
| 2008/0221273 A1 | 9/2008 | Michie, Jr. et al. |
| 2008/0233375 A1 | 9/2008 | Wright et al. |
| 2008/0255311 A1 | 10/2008 | Chang et al. |
| 2008/0274314 A1* | 11/2008 | Gkinosatis ............ B32B 27/308 428/34.9 |
| 2008/0274328 A1 | 11/2008 | Gkinosatis |
| 2008/0305220 A1 | 12/2008 | Gkinosatis |
| 2009/0013656 A1 | 1/2009 | Nasiatka et al. |
| 2009/0034886 A1 | 2/2009 | Conforti |
| 2009/0123614 A1 | 5/2009 | Bernig et al. |
| 2009/0176117 A1 | 7/2009 | Gkinosatis |
| 2009/0191392 A1 | 7/2009 | Gkinosatis |
| 2009/0196962 A1 | 8/2009 | Gkinosatis |
| 2009/0240227 A1 | 9/2009 | Toro et al. |
| 2009/0263599 A1 | 10/2009 | Gkinosatis |
| 2010/0028574 A1 | 2/2010 | Gkinosatis |

(56) References Cited

U.S. PATENT DOCUMENTS

| | | |
|---|---|---|
| 2010/0032098 A1 | 2/2010 | Lalli et al. |
| 2010/0034939 A1 | 2/2010 | Gkinosatis |
| 2010/0221391 A1 | 9/2010 | Fenghua et al. |
| 2011/0039064 A1 | 2/2011 | Wani et al. |
| 2011/0159263 A1 | 6/2011 | Gkinosatis |
| 2011/0285048 A1 | 11/2011 | Barger et al. |
| 2012/0141744 A1* | 6/2012 | Ambroise ............... B32B 7/12 428/195.1 |
| 2012/0213896 A1 | 8/2012 | Owensby et al. |
| 2012/0279181 A1 | 11/2012 | Gkinosatis |
| 2012/0289645 A1 | 11/2012 | Tice et al. |
| 2013/0019568 A1 | 1/2013 | Gkinosatis |
| 2013/0209797 A1 | 8/2013 | Gkinosatis |
| 2013/0227916 A1 | 9/2013 | Gkinosatis |
| 2013/0255498 A1 | 10/2013 | Shibata |
| 2015/0010764 A1 | 1/2015 | Gkinosatis |
| 2015/0122129 A1 | 5/2015 | Shibata |
| 2015/0210454 A1 | 7/2015 | Gkinosatis |
| 2016/0176612 A1 | 6/2016 | Gkinosatis |
| 2016/0236862 A1 | 8/2016 | Gkinosatis |
| 2017/0259542 A1* | 9/2017 | Gkinosatis ............. B65D 65/40 |
| 2019/0193379 A1 | 6/2019 | Gkinosatis |
| 2019/0241335 A1 | 8/2019 | Ginosatis |
| 2019/0283383 A1 | 9/2019 | Ginosatis |
| 2020/0180284 A1 | 6/2020 | Ginosatis |
| 2021/0245478 A1 | 8/2021 | Ginosatis |

FOREIGN PATENT DOCUMENTS

| | | |
|---|---|---|
| CZ | 2017-133 A3 | 9/2017 |
| EP | 0 005 660 | 11/1979 |
| EP | 0144239 A2 | 6/1985 |
| EP | 0243510 A1 | 11/1987 |
| EP | 0 286 407 | 10/1988 |
| EP | 0 402 043 | 12/1990 |
| EP | 0 472 418 | 2/1992 |
| EP | 0292477 B1 | 3/1993 |
| EP | 0 627 465 | 12/1994 |
| EP | 0 686 497 A2 | 12/1995 |
| EP | 0 810 087 | 12/1997 |
| EP | 0810077 A2 | 12/1997 |
| EP | 1 072 632 A2 | 1/2001 |
| EP | 1300238 A2 | 4/2003 |
| EP | 0 930 349 B1 | 6/2003 |
| EP | 1 060 077 | 6/2003 |
| EP | 1 131 205 | 12/2004 |
| EP | 1 514 680 A1 | 3/2005 |
| EP | 1592078 A2 | 11/2005 |
| EP | 1 415 930 | 4/2006 |
| EP | 1 770 116 A1 | 4/2007 |
| EP | 1 854 625 A1 | 11/2007 |
| EP | 08162162.5 | 8/2008 |
| EP | 1 985 440 A2 | 10/2008 |
| EP | 1 985 443 A2 | 10/2008 |
| EP | 1 995 058 A1 | 11/2008 |
| EP | 2 077 239 A2 | 7/2009 |
| EP | 2 077 297 A1 | 7/2009 |
| EP | 2 085 216 A1 | 8/2009 |
| EP | 2 111 979 A2 | 10/2009 |
| EP | 2 147 783 A1 | 1/2010 |
| EP | 2 194 006 A1 | 6/2010 |
| EP | 2 332 723 A1 | 6/2011 |
| EP | 2 520 518 A2 | 11/2012 |
| EP | 2985148 A1 | 2/2016 |
| EP | 3216599 A1 | 9/2017 |
| GB | 792290 | 3/1958 |
| GB | 1 140 765 | 1/1969 |
| GB | 2 203 326 | 10/1988 |
| GB | 2 236 531 | 4/1991 |
| JP | 62107810 A | 5/1987 |
| JP | 03 200534 | 9/1991 |
| JP | H06322140 A | 11/1994 |
| JP | 07196818 | 8/1995 |
| JP | 07206004 | 8/1995 |
| JP | 07206005 | 8/1995 |
| JP | 07206006 | 8/1995 |
| JP | 2002-234975 | 8/2002 |
| JP | 2003-159761 | 6/2003 |
| JP | 2005-047959 | 2/2005 |
| JP | 2005-335111 | 12/2005 |
| JP | 2006-247870 | 9/2006 |
| NZ | 567768 | 11/2009 |
| NZ | 567767 | 5/2010 |
| WO | WO1996/001736 | 1/1996 |
| WO | WO 97/12758 A1 | 4/1997 |
| WO | WO1997/046384 | 12/1997 |
| WO | WO1998/021274 | 5/1998 |
| WO | WO1998/021276 | 5/1998 |
| WO | WO1999/044824 | 9/1999 |
| WO | WO1999/057612 | 11/1999 |
| WO | WO2000/061439 | 10/2000 |
| WO | WO0063085 A1 | 12/2000 |
| WO | WO2001/023268 | 4/2001 |
| WO | WO2002/026493 | 4/2002 |
| WO | WO2003/020515 A1 | 3/2003 |
| WO | WO 2003/061959 A1 | 7/2003 |
| WO | WO2006/053885 | 5/2006 |
| WO | WO2006/075141 | 7/2006 |
| WO | WO 2006/076393 A2 | 7/2006 |
| WO | WO2006/102152 | 9/2006 |
| WO | WO053603 | 5/2007 |
| WO | WO2008/091321 | 7/2008 |
| WO | WO2008/118554 | 10/2008 |
| WO | WO 2009/052291 A2 | 4/2009 |
| WO | WO 2011/029597 | 3/2011 |

OTHER PUBLICATIONS

Office Action corresponding to U.S. Appl. No. 14/612,175 dated Aug. 20, 2019.
Office Action corresponding to U.S. Appl. No. 14/612,175 dated Mar. 3, 2020.
Office Action corresponding to U.S. Appl. No. 12/322,347 dated Mar. 3, 2020.
Office Action corresponding to U.S. Appl. No. 14/946,169 dated Apr. 30, 2020.
Search Report corresponding to Turkish Patent Application No. 2018/19787 dated Mar. 27, 2020.
Office Action corresponding to U.S. Appl. No. 14/612,175 dated Jun. 10, 2020.
Office Action corresponding to U.S. Appl. No. 12/322,347 dated Jul. 2, 2020.
Advisory Action corresponding to U.S. Appl. No. 12/322,347 dated Nov. 23, 2020.
Office Action corresponding to U.S. Appl. No. 14/612,175 dated Nov. 23, 2020.
Extended European Search Report corresponding to European Patent Application No. 18213603.6-1107 dated Apr. 3, 2019.
Extended European Search Report corresponding to European Patent Application No. 18213611.9-1107 dated Apr. 3, 2019.
Office Action corresponding to European Patent Application No. 10193414.9 dated Apr. 11, 2019.
Office Action corresponding to U.S. Appl. No. 14/946,169 dated Jul. 5, 2019.
"15.13xEA—Ethylene Vinyl Acetate (EVA) Copolymers (>50% Ethylene)—European Adhesives," The ChemQuest Group, Inc. http://web.archive.org/web/20080219220919/http://www.chemquest.com/store/ethylene-vinyl-acetate-copolymers-european-adhesives.html (Aug. 26, 2011) (2 pages).
Adsyl 6 C 30 F, LyondellBasell Industries Holdings, B.V., pp. 1-2 (2014).
Adsyl 7572 XCP, LyondellBasell Industries Holdings, B.V., pp. 1-2 (Oct. 3, 2014).
Advisory Action corresponding to U.S. Appl. No. 12/319,150 dated Nov. 13, 2013.
Advisory Action and AFCP 2.0 Decision corresponding to U.S. Appl. No. 11/801,609 dated Jun. 16, 2016.

(56) References Cited

OTHER PUBLICATIONS

Advisory Action, Examiner Initiated Interview Summary, and AFCP 2.0 Decision corresponding to U.S. Appl. No. 14/612,175 dated Jan. 4, 2017.
Annonymous, "Advantages of metallocene ethylene [olymer resins in multilayer stretch films," Research Disclosure, Mason Publications, Hampshire, GB. vol. 419, No. 26, pp. 1-22 (1999).
Annonymous, "Some benefits from the use of metallocene ethylene polymers in blown and cast films," Research Disclosure, Mason Publications, Hampshire, GB. vol. 392, No. 54, pp. 1-6 (1996).
ASTM D 1003-07 "Haze and Luminous Transmittance of Transparent Plastics," ASTM International. pp. 1-7 (Nov. 2007).
ASTM D 1525-07 "Vicat Softening Temperature of Plastics," ASTM International, pp. 1-9 (Mar. 2007).
ASTM D 2732-03 "Unrestrained Linear Thermal Shrinkage of Plastic Film and Sheeting," ASTM International, pp. 1-5 (Oct. 2003).
ASTM D3418-08. Standard Test Method for Transition Temperatures and Enthalpies of Fusion and Crystallization of Polymers by Differential Scanning Calorimetry. American National Standards Institute. pp. 1-7 (Dec. 2008).
ASTM D3985. Standard Test Method for Oxygen Gas Transmission Rate Through Plastic Film and Sheeting Using a Coulometric Sensor. American National Standards Institute, pp. 1-7 (Nov. 2012).
ASTM D882-09. Standard Test Method for Tensile Properties of Thin Plastic Sheeting. American National Standards Institute, pp. 1-9 (Jan. 2009).
ASTM F1927-07. Standard Test Method for Determination of Oxygen Gas Transmission Rate, Permeability and Permeance at Controlled Relative Humidity Through Barrier Materials Using a Coulometric Detector. American National Standards Institute, pp. 1-6 (Aug. 2007).
"Baymod L 2450," Product Data Sheet, LANXESS. (2 pages) (2007).
BS 2782-0:2004 "Methods of Testing Plastics," British Standards Institution, pp. 1-29 (2004).
Communication pursuant to Article 94(3) EPC corresponding to European Patent Application Serial No. 12 192 895.6 dated May 12, 2014.
Communication pursuant to Article 94(3) EPC corresponding to European Patent Application Serial No. 12 192 895.6 dated Feb. 18, 2015.
Communication pursuant to Article 94(3) EPC corresponding to European Patent Application Serial. No. 12 192 895.6 dated Dec. 9, 2015.
Communication pursuant to Article 94(3) EPC corresponding to European Patent Application Serial No. 12 192 895.6 dated Oct. 7, 2016.
Communication pursuant to Article 94(3) EPC corresponding to European Patent Application Serial No. 12 192 895.6 dated Apr. 13, 2017.
Communication under Rule 71(3) EPC Intention to Grant corresponding to European Patent Application Serial No. 12 192 895.6 dated Apr. 20, 2018.
"DuPontTM Elvax® 3170," DuPont Packaging & Industrial Polymers. 3 pages (2004) http://web.archive.org/web/20060516114601/http://www2.dupont.com/Elvax/en_US/assets/downloads/vax3170.pdf.
Eltax P KS399, Published by INEOS Olefins & Polymers Europe, pp. 1-2 (Nov. 2013).
"Elvaloy resins," Product Data Sheet, DuPont Packaging & Industrial Polymers. (2 pages) (2010).
English abstract of JP 2005-103902, USUI, Apr. 2005.
European Search Report corresponding to European Patent Application No. 08173057.4-2307 dated Sep. 22, 2009.
European Search Report corresponding to European Patent Application No. 08173056.6-2109 dated Mar. 16, 2009.
Extended European Search report corresponding to European Patent Application No. 09151289.7-2124 dated Jun. 8, 2009.
Extended European Search Report corresponding to European Patent Application No. 05021541.7-2115 dated Dec. 2, 2005.
Extended European Search Report corresponding to European Patent Application No. 08156814 dated Oct. 9, 2008.
Extended European Search Report corresponding to European Patent Application No. 08154742.4-2124 dated Jul. 2, 2009.
Extended European Search Report corresponding to European Patent Application No. 10193414.9-1217 dated May 9, 2011.
Extended European Search Report corresponding to European Patent Application No. 12192895.6-1708 dated Mar. 1, 2013.
"Filling and sealing of containers" in Fellows, P.J. Food Processing Technology—Principles and Practice (2nd Edition), Woodhead Publishing, pp. 511-527 (2000).
Harper, "Modern Plastics Handbook," McGraw-Hill: New York, New York. pp. 3.17-3.22 (2000).
Hough, M., and Dolbey, R., "Modern Plastics Compendium, vol. 1—Key Properties and Sources," Smithers Rapra Technology. pp. 87-124 (1995).
Huskić, M., and Šebenik, A., "Characterization of Crosslinked Ethylene-Vinylacetate Copolymers," Polymer International. vol. 31, No. 1 pp. 41-44 (1993).
Interview Summary corresponding to U.S. Appl. No. 11/801,609 dated Jul. 31, 2012.
Interview Summary corresponding to U.S. Appl. No. 12/150,261 dated Dec. 28, 2010.
Interview Summary corresponding to U.S. Appl. No. 12/150,261 dated Sep. 21, 2011.
Interview Summary corresponding to U.S. Appl. No. 12/150,261 dated Jun. 12, 2012.
Interview Summary corresponding to U.S. Appl. No. 12/319,149 dated Oct. 17, 2011.
Interview Summary corresponding to U.S. Appl. No. 12/319,149 dated Jun. 15, 2012.
Interview Summary corresponding to U.S. Appl. No. 12/319,150 dated Sep. 23, 2011.
Interview Summary corresponding to U.S. Appl. No. 12/319,150 dated Sep. 6, 2013.
Interview Summary corresponding to U.S. Appl. No. 12/322,347 dated Sep. 21, 2011.
Interview Summary corresponding to U.S. Appl. No. 12/508,233 dated Apr. 26, 2012.
Interview Summary corresponding to U.S. Appl. No. 13/722,323 dated Jan. 22, 2016.
Interview Summary corresponding to U.S. Appl. No. 13/682,160 dated Oct. 28, 2016.
Interview Summary corresponding to U.S. Appl. No. 14/946,169 dated Nov. 8, 2018.
Kerns, "What's the Difference Between Batteries and Capacitors?" Machine Design, Batteries/Power Supplies, pp. 1-4 (May 11, 2015).
Kipp, "Plastic Material Data Sheets," MatWeb (2004) (5 pages).
Machine Translation of JP 2005-103902, USUI, Apr. 2005.
Notice of Allowance corresponding to U.S. Appl. No. 11/528,741 dated Oct. 28, 2011.
Notice of Allowance corresponding to U.S. Appl. No. 12/150,168 dated Nov. 25, 2013.
Notice of Allowance corresponding to U.S. Appl. No. 13/157,876 dated Nov. 12, 2015.
Notice of Allowance corresponding to U.S. Appl. No. 12/319,150 dated Feb. 12, 2016.
Notice of Allowance corresponding to U.S. Appl. No. 13/523,462 dated May 16, 2016.
Notice of Allowance corresponding to U.S. Appl. No. 13/722,323 dated Nov. 18, 2016.
Notice of Allowance corresponding to U.S. Appl. No. 14/304,101 dated Jul. 10, 2017.
Notice of Allowance corresponding to U.S. Appl. No. 15/042,615 dated Nov. 21, 2018.
Notice of Decision from Post-Prosectuion Pilot Program (P3) Conference corresponding to U.S. Appl. No. 12/957,947 dated Dec. 14, 2016.
Office Action corresponding to European Patent Application No. 10 193 414.9-1303 dated Oct. 29, 2014.

(56) References Cited

OTHER PUBLICATIONS

Office Action corresponding to New Zealand Patent Application No. 626181 dated Jun. 18, 2014.
Office Action corresponding to United Kingdom Patent Application No. GB1020302.4 dated Jul. 2, 2014.
Office Action corresponding to United Kingdom Patent Application No. GB1020302.4 dated Dec. 11, 2014.
Office Action corresponding to U.S. Appl. No. 11/801,609 dated Sep. 15, 2009.
Office Action corresponding to U.S. Appl. No. 11/801,609 dated Feb. 5, 2010.
Office Action corresponding to U.S. Appl. No. 12/150,261 dated Oct. 27, 2009.
Office Action corresponding to U.S. Appl. No. 12/319,149 dated Oct. 15, 2009.
Office Action corresponding to U.S. Appl. No. 11/528,741 dated Mar. 30, 2010.
Office Action corresponding to U.S. Appl. No. 12/150,261 dated Jul. 7, 2010.
Office Action corresponding to U.S. Appl. No. 12/319,149 dated Jul. 7, 2010.
Office Action corresponding to U.S. Appl. No. 11/801,609 dated Jul. 15, 2010.
Office Action corresponding to U.S. Appl. No. 12/322,347 dated Sep. 14, 2010.
Office Action corresponding to U.S. Appl. No. 12/319,150 dated Oct. 15, 2010.
Office Action corresponding to U.S. Appl. No. 11/528,741 dated Jan. 4, 2011.
Office Action corresponding to U.S. Appl. No. 12/508,233 dated Mar. 9, 2011.
Office Action corresponding to U.S. Appl. No. 12/150,168 dated Feb. 16, 2011.
Office Action corresponding to U.S. Appl. No. 12/319,149 dated Mar. 16, 2011.
Office Action corresponding to U.S. Appl. No. 12/319,149 dated Mar. 22, 2011.
Office Action corresponding to U.S. Appl. No. 12/154,662 dated Mar. 29, 2011.
Office Action corresponding to U.S. Appl. No. 12/319,150 dated Apr. 26, 2011.
Office Action corresponding to U.S. Appl. No. 11/528,741 dated May 18, 2011.
Office Action corresponding to U.S. Appl. No. 12/154,662 dated Jun. 20, 2011.
Office Action corresponding to U.S. Appl. No. 12/154,662 dated Aug. 18, 2011.
Office Action corresponding to U.S. Appl. No. 12/154,662 dated Jan. 18, 2012.
Office Action corresponding to U.S. Appl. No. 12/512,361 dated Aug. 31, 2011.
Office Action corresponding to U.S. Appl. No. 12/150,168 dated Sep. 23, 2011.
Office Action corresponding to U.S. Appl. No. 12/322,347 dated Oct. 26, 2011.
Office Action corresponding to U.S. Appl. No. 12/319,150 dated Nov. 4, 2011.
Office Action corresponding to U.S. Appl. No. 12/508,233 dated Nov. 23, 2011.
Office Action corresponding to U.S. Appl. No. 12/508,233 dated Jun. 6, 2012.
Office Action corresponding to U.S. Appl. No. 12/319,149 dated Dec. 2, 2011.
Office Action corresponding to U.S. Appl. No. 12/957,947 dated Jan. 17, 2012.
Office Action corresponding to U.S. Appl. No. 11/801,609 dated Jan. 30, 2012.
Office Action corresponding to U.S. Appl. No. 12/150,261 dated Jan. 31, 2012.
Office Action corresponding to U.S. Appl. No. 12/426,496 dated Feb. 7, 2012.
Office Action corresponding to U.S. Appl. No. 12/512,361 dated May 2, 2012.
Office Action corresponding to U.S. Appl. No. 12/322,347 dated May 15, 2012.
Office Action corresponding to U.S. Appl. No. 12/150,168 dated Aug. 14, 2012.
Office Action corresponding to U.S. Appl. No. 12/319,149 dated Aug. 27, 2012.
Office Action corresponding to U.S. Appl. No. 12/957,947 dated Sep. 25, 2012.
Office Action corresponding to U.S. Appl. No. 12/319,150 dated Mar. 14, 2013.
Office Action corresponding to U.S. Appl. No. 12/150,168 dated Apr. 26, 2013.
Office Action corresponding to U.S. Appl. No. 12/957,947 dated Jul. 24, 2013.
Office Action corresponding to U.S. Appl. No. 13/157,876 dated Nov. 19, 2013.
Office Action corresponding to U.S. Appl. No. 11/801,609 dated Nov. 29, 2013.
Office Action corresponding to U.S. Appl. No. 13/722,323 dated Mar. 27, 2014.
Office Action corresponding to U.S. Appl. No. 12/957,947 dated Apr. 24, 2014.
Office Action corresponding to U.S. Appl. No. 13/157,876 dated Jun. 2, 2014.
Office Action corresponding to U.S. Appl. No. 12/322,347 dated Aug. 1, 2014.
Office Action corresponding to U.S. Appl. No. 11/801,609 dated Sep. 24, 2014.
Office Action corresponding to U.S. Appl. No. 13/722,323 dated Jan. 7, 2015.
Office Action corresponding to U.S. Appl. No. 12/957,947 dated Jan. 7, 2015.
Office Action corresponding to U.S. Appl. No. 13/523,462 dated Jan. 30, 2015.
Office Action corresponding to U.S. Appl. No. 13/157,876 dated Mar. 3, 2015.
Office Action corresponding to U.S. Appl. No. 12/322,347 dated May 20, 2015.
Office Action corresponding to U.S. Appl. No. 11/801,609 dated Jun. 12, 2015.
Office Action corresponding to U.S. Appl. No. 13/682,160 dated Jun. 15, 2015.
Office Action corresponding to U.S. Appl. No. 13/722,323 dated Jul. 17, 2015.
Office Action corresponding to U.S. Appl. No. 12/319,150 dated Jul. 22, 2015.
Office Action corresponding to U.S. Appl. No. 12/957,947 dated Sep. 16, 2015.
Office Action corresponding to U.S. Appl. No. 13/523,462 dated Sep. 21, 2015.
Office Action corresponding to U.S. Appl. No. 14/612,175 dated Dec. 9, 2015.
Office Action corresponding to U.S. Appl. No. 13/682,160 dated Jan. 29, 2016.
Office Action corresponding to U.S. Appl. No. 11/801,609 dated Feb. 2, 2016.
Office Action corresponding to U.S. Appl. No. 12/322,347 dated Feb. 18, 2016.
Office Action corresponding to U.S. Appl. No. 12/957,947 dated Mar. 31, 2016.
Office Action corresponding to U.S. Appl. No. 13/722,323 dated May 3, 2016.
Office Action corresponding to U.S. Appl. No. 13/682,160 dated Jun. 30, 2016.
Office Action corresponding to U.S. Appl. No. 14/304,101 dated Jun. 30, 2016.
Office Action corresponding to U.S. Appl. No. 14/612,175 dated Aug. 5, 2016.

(56) References Cited

OTHER PUBLICATIONS

Office Action corresponding to U.S. Appl. No. 12/322,347 dated Aug. 17, 2016.
Office Action corresponding to U.S. Appl. No. 12/957,947 dated Sep. 26, 2016.
Office Action corresponding to U.S. Appl. No. 11/801,609 dated Nov. 16, 2016.
Office Action corresponding to U.S. Appl. No. 14/304,101 dated Dec. 9, 2016.
Office Action corresponding to U.S. Appl. No. 13/682,160 dated Mar. 2, 2017.
Office Action corresponding to U.S. Appl. No. 11/801,609 dated Jun. 14, 2017.
Office Action corresponding to European Patent Application No. 10193414.9 dated May 16, 2017.
Office Action corresponding to U.S. Appl. No. 12/957,947 dated Sep. 19, 2017.
Office Action corresponding to U.S. Appl. No. 13/682,160 dated Dec. 12, 2017.
Office Action (Restriction Requirement) corresponding to U.S. Appl. No. 14/946,169 dated Jan. 4, 2018.
Office Action corresponding to U.S. Appl. No. 12/322,347 dated Mar. 30, 2018.
Office Action corresponding to U.S. Appl. No. 14/612,175 dated Mar. 30, 2018.
Office Action corresponding to U.S. Appl. No. 15/042,615 dated Mar. 30, 2018.
Office Action corresponding to U.S. Appl. No. 12/957,947 dated May 7, 2018.
Office Action corresponding to U.S. Appl. No. 13/682,160 dated Jul. 25, 2018.
Office Action corresponding to U.S. Appl. No. 14/946,169 dated Aug. 16, 2018.
Office Action corresponding to U.S. Appl. No. 12/322,347 dated Oct. 25, 2018.
Office Action corresponding to U.S. Appl. No. 14/612,175 dated Nov. 2, 2018.
Office Action (Examiner's Answer) corresponding to U.S. Appl. No. 12/957,947 dated Jan. 4, 2019.
Petrie, "Handbook of Adhesives and Sealants," 2nd Edition. McGraw-Hill: New York, New York. pp. 465-466 (2007).
Pish, "Ragone Plot," 2016 Advisory Panel Energy Storage, Center for Electromechanics, The University of Texas at Austin https://utw10356.utweb.utexas.edu/sites/default/files/Pish.pdf, p. 1, (May 10, 2016).
"Polymer Blend," IUPAC Compendium of Chemical Terminology. 2nd Edition, p. 1 (1997).
"Polybutylene terephthalate," Britannica Online Encyclopedia. pp. 1-3 (Accessed on Sep. 7, 2011) <http://www.britannica.com/EBchecked/topic/468341/polybutylene-terephthalate-PBT>.
"Polybutylene terephthalate (PBT)," 1 page <http://www.britannica.com/EBchecked/topic/468341/polybutylene-terephthalate-PBT> (Accessed on Jun. 13, 2012).
"Polymer Materials Selection for Radiation-Sterilized Products," pp. 1-3 <http://www.mddionline.com/article/polymer-materials-selection-radiation-sterilized-products> dated Feb. 1, 2000.
Polypropylene RB707CF, Borealis AG, Edition 5, pp. 1-3 (Nov. 20, 2013).
"Ragone Chart," Wikipedia, http://en.wikipedia.org/wiki/Ragone_chart, pp. 1-2, downloaded Dec. 21, 2016.
Response to the Summons to Attend Oral Proceedings dated Nov. 15, 2017 corresponding to European Patent Application No. 12192895.6 dated Mar. 27, 2018.

Scherson et al., "Batteries and Electrochemical Capacitors," The Electricochemical Society Interface, pp. 17-22 (2006).
Search Report corresponding to French Patent Application No. 1059997 dated Jan. 16, 2012.
Summons to attend oral proceedings pursuant to Rule 115(1) EPC corresponding to European Patent Application Serial No. 12192895.6 dated Nov. 15, 2017.
Unisource—Moisture Barrier & Oxygen Barrier Transmission Rates; 1 page, <http://www.unisourcelink.com/packaging/pdf/MoistureBarrier.pdf> (Retrieved on Jan. 10, 2012).
Office Action (Restriction Requirement) corresponding to U.S. Appl. No. 16/266,567 dated Dec. 30, 2020.
Office Action corresponding to U.S. Appl. No. 12/322,347 dated Jan. 19, 2021.
Office Action corresponding to U.S. Appl. No. 16/227,191 dated Mar. 9, 2021.
Office Action corresponding to New Zealand Patent Application No. 749501 dated Mar. 11, 2021.
Office Action corresponding to U.S. Appl. No. 16/266,567 dated Apr. 1, 2021.
Office Action corresponding to U.S. Appl. No. 14/612,175 dated May 5, 2021.
Office Action corresponding to U.S. Appl. No. 12/322,347 dated Jun. 15, 2021.
Machine Translation of JP H06-322140, 7 pages (Year: 1994).
Office Action corresponding to U.S. Appl. No. 16/227,191 dated Sep. 24, 2021.
Office Action corresponding to New Zealand Patent Application No. 749501 dated Oct. 27, 2021.
Office Action corresponding to Turkish Patent Application No. 2018/19787 dated Nov. 5, 2021.
Office Action corresponding to U.S. Appl. No. 12/322,347 dated Nov. 19, 2021.
Office Action (Restriction Requirement) corresponding to U.S. Appl. No. 16/266,567 dated Jan. 6, 2022.
Office Action corresponding to U.S. Appl. No. 14/612,175 dated Feb. 18, 2022.
Office Action corresponding to U.S. Appl. No. 14/946,169 dated Apr. 4, 2022.
Office Action corresponding to U.S. Appl. No. 16/227,191 dated Apr. 21, 2022.
PELESTAT 300, "Polymer-Alloy Type Permanent Antistatic Agent for Polyolefin," Harwick Standard Distribution Corporation, harwick.com/files/tds/PELESTAT_300.PDF. 8 pages, dated Apr. 1, 2010.
IonPhasE IPE U1, Technical Data Sheet, IonPhasE Oy, www.uni-trading.com/sub/support/tds.msds/additive/IPE/TDS/IPE-U1%20TDS(EN).pdf, 1 page (2016).
Office Action corresponding to Czech Patent Application No. PV 2018-736 dated May 30, 2022 [Machine Translation].
Office Action corresponding to U.S. Appl. No. 16/266,567 dated Jul. 22, 2022.
Notice of Allowance corresponding to U.S. Appl. No. 14/946,169 dated Feb. 23, 2023.
Notice of Allowability corresponding to U.S. Appl. No. 14/946,169 dated Mar. 2, 2023.
Interview Summary corresponding to U.S. Appl. No. 16/227,191 dated Mar. 10, 2023.
Office Action corresponding to U.S. Appl. No. 16/227,191 dated May 5, 2023.
Office Action with machine translation corresponding to Turkish Application No. 2018/19787 dated Jul. 13, 2023.
Office Action corresponding to U.S. Appl. No. 16/266,567 dated Aug. 3, 2023.

* cited by examiner

FIBC LINER FILM

CROSS REFERENCE TO RELATED APPLICATIONS

The present U.S. patent application claims priority to European Patent Application No. 17210227.9, filed Dec. 22, 2017, the disclosure of which is incorporated herein by reference in its entirety.

TECHNICAL FIELD

The invention relates to plastic film preferably with a thickness of 50 to 300 microns, comprising a polyolefin homopolymer or copolymer, a polyether copolymer having a melting point between 100° C. and 120° C. and a layer comprising oxygen barrier polymer.

BACKGROUND

Plastic containers have been increasingly used in packaging applications, such as "food packaging". A typical plastic container often used for bulk packaging of food (e.g. powdery food, coffee, cocoa, nuts) is called FIBC (=flexible intermediate bulk container). This type of container often is a woven polyethylene or polypropylene.

In the inside or outside of the woven material, another plastic liner is often used. This liner is a monolayer or a multilayer and comprises polymer materials. There are different types of adherence of this liner to the outer woven liner as shown e.g. in U.S. Pat. No. 6,374,579.

In the case of a multilayer, the different layers offer different advantages to the final applications. The inside layer (=the layer coming into direct contact with the food packed) is often formulated to allow very good sealing, thus protecting from the existence of leakers that would be detrimental for the packed product. Other layers may comprise abuse resistant polymers to increase the mechanical strength of the material.

In case of oxygen sensitive food materials, at least one layer of the multilayer construction comprises material which is impermeable to oxygen. As it is well known in the art, such materials are e.g. polyamides, PVDC or EVOH.

Often the multilayer film is in "gusseted tube" configuration. The reason is that this configuration is more practical for bulk filling, transport and unloading versus a simple tube.

Gussets are produced in line with the process by the use of two "pleating constructions" (often wooden or metal boards) which the film follows. As these multilayer tube materials are often produced with the "hot blown film" method which involves rotation of the collapsing frame-nip roll section, a common problem is that creases are present continuously or periodically following the rotation and this increases the scrap and lowers the efficiency of the operation. There are cases where the creases are so often that the tubular film cannot be processed into a gusseted tube.

It is generally known in the art that less stiff polymers e.g. LDPE have better gussetability versus stiffer ones like HDPE. It is believed that the material must be softer and more pliable in order to form efficiently a gusset during the production process. Barrier materials with high oxygen barrier properties such as EVOH or polyamide make the gusseting process even more difficult as they are usually stiffer than polyolefins.

Patent application EP 3 216 599 A1 teaches a way to improve gussetability by using a polyether copolymer (with polyamide or polyolefins) in blend with polyolefins in at least one layer of the film. This invention has the drawback that sealing temperatures start from 140° C. to 160° C. i.e. in conditions higher than pure polyolefins such as polyethylene. There is a need to move the sealing temperature "window" to lower temperatures e.g. down to 120° C. in order to produce liners at same or similar conditions with normal polyethylene non-barrier liners.

There is further a need to improve the gussetability of the plastic structure ie to find materials pliable enough and with enough bubble stability to produce gussets with no creases in the commonly used thickness range of 50-300 microns without sacrificing the oxygen barrier properties of the plastic film. There is also a need to combine this improvement in gussetability with the above requirements in sealing at low temperatures.

SUMMARY

It has been unexpectedly found that the addition of polyether copolymers with melting point of 100° C. to 120° C. in blends with polyolefins improve very much the gussetability of oxygen barrier plastic films and at the same time lower the seal initiation temperature of the film to 120° C.

According to the invention a very suitable film for the FIBC liner has preferably an average thickness of 50 to 300, more preferably an average thickness of 60 to 150, most preferably an average thickness of 60 to 130 microns and comprises

- a polyolefin homopolymer or copolymer
- a polyether copolymer having a melting point in the range of 100° C. to 120° C.,
- an oxygen barrier material such as EVOH, polyamide or PVDC Further preferred embodiments of the invention will be explained in the detailed description of the invention.

DEFINITIONS

In this application the following definitions are used:

The term "gusset" is interpreted as well known in the art. That is a plastic tubular film having a partial 4-fold configuration.

The term "film" refers to a flat or tubular flexible structure of thermoplastic material.

The term "heat shrinkable" refers to a film that shrinks at least 10% in at least one of the longitudinal and transverse directions when heated at 90° C. for 4 seconds. The shrinkability is measured according to ASTM 2732.

The phrase "longitudinal direction" or "machine direction" herein abbreviated "MD" refers to a direction along the length of the film.

The phrase "outer layer" refers to the film layer which comes in immediate contact with the outside environment (atmosphere).

The phrase "inner layer" refers to the film layer that comes in direct contact with the product packed. This is also called "sealing layer" as this layer must be hermetically sealed in order to protect the product from ingress of air.

The phrase "intermediate layer" refers to any layer of the film that is neither outer nor inner layer. A film may comprise more than one intermediate layers.

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types.

As used herein, the term "polyolefin" includes all the polymers produced by polymerization of olefins. Polyethylene, polypropylene, polybutylene and other products are included in this general category.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low-density polyethylene (LLDPE), medium density polyethylene (MDPE), very low density polyethylene (VLDPE), ultra-low density polyethylene (ULDPE), metallocene catalysed polymers and polyethylene plastomers and elastomers.

In these cases, the alpha olefin can be propene, butene, hexene, octene etc as known in the art.

As used herein the term "homogeneous ethylene alpha olefin copolymers" refer to ethylene alpha olefin copolymers having a molecular weight distribution MWD ($M_w/M_n$) of less than 2.7 as measured by GPC. Typical examples of these polymers are AFFINITY from DOW or Exact from Exxon.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40% by weight. Abbreviation used is EMA.

As used herein the phrase "ethylene vinyl acetate copolymer" refers to copolymers of ethylene and vinyl acetate. Abbreviation used is EVA.

As used herein the term "oxygen barrier polymer" refers to polymers that do not allow the ingress of oxygen in packs. Typical materials are polyamide, EVOH or PVDC.

As used herein, the term EVOH refers to saponified products of ethylene vinyl ester copolymers. The ethylene content is typically in the range of 25 to 50% per mol.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term polyamide refers to homopolymers and copolymers that include amide linkages as well known in the art.

As used herein the term "ionomer" refers to ethylene-acid copolymers which have been neutralized by metals such as sodium, zinc, lithium or others.

The acid used is usually methacrylic or acrylic acid.

As used herein, the term "ethylene acid copolymer" refers to copolymers of ethylene with acid, most usually methacrylic or acrylic acid.

As used herein, the term "polyester" includes crystalline polymers, amorphous polymers and polyester elastomers. Common polyesters are crystalline PET (polyethylene terephthalate), amorphous PET, PETG (glycol modified polyethylene terephthalate), PBT (polybutylene terephthalate), PTT (polytrimethylene terephthalate), PBN (polybutylene naphthalate), PEN (polyethylene naphthalate), polyester-ether block copolymers and polyester-ester block copolymers of hard and soft blocks.

Other polyester materials are also included in the above definition.

As used herein the term "polybutylene" refers to butene-1 homopolymers and copolymers. Useful copolymers comprise ethylene mer units. Ethylene content should be generally less than 50% by weight.

All measurement methods mentioned herein are readily available for the skilled person. For example, they can be obtained from the American National Standards Institute at: www.webstore.ansi.org.

All percentages used are per weight unless stated otherwise.

DETAILED DESCRIPTION

The present invention relates to a film comprising
a polyolefin homopolymer or copolymer
a polyether copolymer having melting point in the range of 100° C. to 120° C.
an oxygen barrier material.

In a preferred embodiment, the film is in the form of gusseted tube.

In a further preferred embodiment, the average thickness of the film is in the range 50-300 microns, preferably 60-150 microns, more preferably 60-130 microns.

In a further preferred embodiment, the polyolefin homopolymer or copolymer is an ethylene alpha olefin copolymer. In a further preferred embodiment, the alpha olefin is butene, hexene or octene. In a further preferred embodiment, the ethylene alpha olefin copolymers are produced with metallocene catalysts.

FILM CONSTRUCTION

Preferably the film comprises 5 to 15 layers, more preferably 7 to 12 layers.

A typical example of the film construction in 7-layer mode is
Outer layer/intermediate layer/tie layer/barrier layer/tie layer/intermediate layer/inner layer The film is preferably produced by the hot blown film method and is not heat shrinkable.

Barrier Layer(s)

The film in a preferable embodiment contains high oxygen barrier materials so that it protects the components of the pack from the detrimental effect of oxygen ingress.

EVOH is a preferred option but also polyamide and PVDC are viable alternatives. The EVOH comprises preferably 24% to 50% ethylene per mol, more preferably 27% to 48%.

In another preferred embodiment of the invention, the barrier polymer is polyamide. Most suitable polyamides are polyamide 6 and copolymer 6/66 or 6/12.

Intermediate Layer(s)

Preferably, the intermediate layers comprise different polyolefins. Preferred polyolefins are ethylene alpha olefin copolymers, where alpha olefin is preferably butene, hexene or octene.

In a preferred embodiment the ethylene alpha olefin copolymers are random copolymers with densities from 0.870 g/cm³ up to 0.960 g/cm³. In a further preferred embodiment, the molecular weight distribution MWD ($M_w/M_n$) as measured by GPC of the ethylene alpha olefin copolymers is less than 10, preferably less than 5, preferably less than 3.

Tie Layer(s)

As well known in the art, there is no natural adhesion between polyolefins and oxygen barrier polymers such as EVOH.

Suitable materials for the tie layer process include maleic anhydride modified EVA, maleic anhydride modified polyethylene, maleic anhydride modified EMA, maleic anhydride modified elastomer, partially saponified EVA copolymer and polyurethane elastomer.

In the tie layers also polyamides can be used, given the strong natural adhesion between polyamide and EVOH. Preferred polyamides are polyamide 6, polyamide 6/66 and polyamide 6/12.

Outer Layer

The outer layer of the film preferably comprises ethylene alpha olefin copolymers and/or low-density polyethylene (LDPE) produced by Ziegler Natta or metallocene catalyst. Polypropylene, ethylene vinyl acetate, ethylene methyl acrylate, ethylene butyl acrylate, ionomer, polyester and polyamide is also possible.

Inner Layer

The inner layer of the film would be able to seal the film to itself to secure that no leakers and oxygen influx is allowed. This could be detrimental to the product packed.

Suitable materials for the inner layer include different polyolefins, preferably ethylene alpha olefin copolymers, low density polyethylene, polypropylene, ethylene vinyl acetate, ethylene methyl acrylate, ionomer, ethylene butyl acrylate and the like.

In general, the above layers may comprise further well known in the art additives such as antiblock, slip, antifog, polymer processing enhancers and others.

Polyether Copolymers

We have unexpectedly noticed that by adding polyether copolymers having a melting point of 100° C. to 120° C. in the inner layer, the seal initiation temperature of the film drops to 120° C. while the gussetability of the film remains very good. The film is nicely transformed inline to a gusseted tube without any creasing during the whole rotation of the collapsing frame. Preferably, the polyether copolymers having a melting point of 100° C. to 120° C. are added in the inner layer, in an amount of 5% to 20% by weight.

Preferred polyether copolymers are copolymers with polyolefins, polyamides or polyester. A typical example of a polyether copolymer useful for the invention is Pelestat LM230 from Sanyo Chemical.

In a preferred embodiment the melting points of the polyether copolymers are in the range 100° C. to 120° C., preferably 110° C. to 120° C. If the melting temperature is lower the gussetability is compromised by the higher friction due to polymer tackiness while if the melting temperatures are higher the sealing initiation temperature increases.

The preferred melt flow index (MFI) of the polyether copolymer is more than 12 at 190° C. and 21.18 N measured according to ASTM D 1238.

SEAL INITIATION TEMPERATURE

This term as used in the present application is defined as the lower sealing temperature which allows the average sealing strength (measured according to ASTM F88) to be at least 25N/15 mm seal width when the sealing time is 2 seconds, sealing pressure is 4 bars and the sealing station is impulse type. Films of the present invention have seal initiation temperature less than 130° C., preferably less than 125° C., preferable less than 120° C., preferably less than 115° C.

MELTING POINT OF POLYETHER COPOLYMER

The melting point of the polyether copolymer is measured by DSC (=differential scanning calorimetry) as well known in the art. The polyether copolymer used in the present invention has a melting point between 100° C. and 120° C.

The preferred method for producing the film of the present invention is how blown film as well known in the art.

EXAMPLES

Example 1

From a commercial hot blown film line we produced the following film

Outer layer, thickness 30 microns
Intermediate layer 1, thickness 10 microns
Tie layer 1, thickness 8 microns
EVOH 38%, thickness 8 microns
Tie layer 2, thickness 8 microns
Intermediate layer 2, thickness 20 microns
Inner layer, thickness 12 microns.
Outer layer was a blend of
89% LDPE+10% polyether copolymer+1% slip antiblock masterbatch.
LDPE density was 0.923 while MFI was 0.75 under 1900/2.16 kilos
Intermediate layer 1 was a blend of
60% ethylene hexene copolymer+40% LDPE
The density of ethylene hexene copolymer was 0.919 while MFI was 1 under 190° C./2.16 kilos
LDPE was same as used in the outer layer.
Tie layer 1 was maleic anhydride LLDPE based copolymer
Tie layer 2 was similar to tie layer 1
Intermediate layer 2 was exactly the same as intermediate layer 1.
Inner layer was a blend of
89% metallocene LLDPE +10% polyether copolymer+ 1% slip antiblock masterbatch Metallocene LLDPE had a density of 0.918 while MFI was 1 under 190° C./2.16 kilos
Polyether copolymer used was Pelestat LM230 from Sanyo Chemical.

Example 2

In the case of example 2 the LDPE used in the outer layer was replaced by the ethylene hexene copolymer used in intermediate layer 1.

Example 3

In this example, the EVOH 38% was replaced by 32% which is stiffer and thought to be more difficult to form gusset.

COMPARATIVE EXAMPLE

The comparative example was like example 1 but with the polyether copolymer removed and replaced by MV PEBAX 1074 SA01. This material has a melting point of 158° C. as measured by differential scanning calorimetry (DSC).

EXAMINING SYSTEM

On the tower of the blown film line two gusset boards were mounted as known in the art. Each example structure ran in production for 2 hours and the number of creases was monitored. As the creases tend to come along in timely intervals, we recorded "creasing instances", meaning we recorded any incident when more than 3 creases passed from the nip section of the blown film line.

The rotation speed was kept constant during all experiments.

RESULTS

Examples 1 and 2 recorded 2 instances while example 3 recorded 3.

The comparative example recorded 2 instances.

Therefore, the invention keeps the good gussetability of the prior art.

SEAL INITIATION

Test of the seal initiation was done in a Toss sealing machine, keeping the sealing time at 2 seconds and seal pressure at 4 bars. Sealing was done inner side to inner side.

The measured seal initiation temperature of example 1 was found to be 120° C. while for the comparative example a seal initiation temperature of 170° C. has been measured.

What is claimed is:

1. A plastic film comprising
   an inner layer comprising a blend of a polyolefin homopolymer or copolymer and a polyether copolymer having a melting point in the range of 100° C. to 120° C., wherein the inner layer is a layer that comes in direct contact with a product to be packed; and
   a layer comprising an oxygen barrier material.

2. The plastic film of claim 1, where the thickness of the film is between 50 and 300 microns.

3. The plastic film of claim 2, where the thickness of the film is between 60 and 150 microns.

4. The plastic film of claim 2, where the oxygen barrier material is ethylene vinyl alcohol (EVOH).

5. The plastic film of claim 2, where the oxygen barrier material is a polyimide.

6. The plastic film of claim 2, where the polyolefin homopolymer or copolymer is polyethylene or polypropylene.

7. The plastic film of claim 2, where the polyolefin homopolymer or copolymer is an ethylene alpha olefin copolymer.

8. The plastic film of claim 2, where the polyether copolymer is a polyolefin, polyamide or polyester copolymer.

9. The plastic film of claim 2, where the polyether copolymer is contained in both inner and outer layers.

10. A gusseted tubular film made of a plastic film of claim 2.

11. The plastic film of claim 1, where the oxygen barrier material is ethylene vinyl alcohol (EVOH).

12. The plastic film of claim 1, where the oxygen barrier material is a polyimide.

13. The plastic film of claim 1, where the polyolefin homopolymer or copolymer is polyethylene or polypropylene.

14. The plastic film of claim 1, where the polyolefin homopolymer or copolymer is an ethylene alpha olefin copolymer.

15. The plastic film of claim 14, where the polyether copolymer is a block copolymer.

16. The plastic film of claim 1, where the polyether copolymer is a polyolefin, polyamide or polyester copolymer.

17. The plastic film of claim 1, where the polyether copolymer is contained in both inner and outer layers.

18. A gusseted tubular film made of a plastic film of claim 1.

* * * * *